ELECTRIC SWITCHES

Filed Jan. 28, 1966

3 Sheets-Sheet 1

March 7, 1967 A. W. KRIEGER ETAL 3,308,260

ELECTRIC SWITCHES

Filed Jan. 28, 1966 3 Sheets-Sheet 2

Inventors
Alvin W. Krieger
Thomas J. Schimmels
By Wm. A. Autio
Attorney

ELECTRIC SWITCHES

Inventors
Alvin W. Krieger
Thomas J. Schimmels
By Wm. A. Autio
Attorney

United States Patent Office 3,308,260
Patented Mar. 7, 1967

3,308,260

ELECTRIC SWITCHES

Alvan W. Krieger and Thomas J. Schimmels, Milwaukee, Wis., assignors to Cutler-Hammer, Inc., Milwaukee, Wis., a corporation of Delaware Filed Jan. 28, 1966, Ser. No. 523,766
12 Claims. (Cl. 200—168)

This invention relates to electric switches and more particularly to manually operable switches of the snap-in type with or without indicator lights and adapted for receiving therein any one of a plurality of different types of manual operators.

While not limited thereto, the invention is especially applicable to double pole alternating current switches of the molded base type incorporating means affording snap-in mounting in an aperture in a mounting panel.

An object of the invention is to provide improved electric switches of the snap-in type.

A more specific object of the invention is to provide improved electric switches of the molded base type without any indicator light or with one or two indicator lights.

Another specific object of the invention is to provide an electric switch with an improved switch base constructed and arranged to accommodate any one of a plurality of different types of actuators.

Another specific object of the invention is to provide an electric switch with an interlocked double pushbutton actuator of a molded one-piece construction.

Another specific object of the invention is to provide means molded integrally with the base for affording snap-in mounting in an aperture in mounting panels of different thicknesses.

Another specific object of the invention is to provide an illuminated electric switch with an improved molded base affording snap-in mounting of lamp base, lens and cover.

Other objects and advantages of the invention will hereinafter appear.

These and other objects and advantages of the invention and the manner of obtaining them will best be understood by reference to the following description of selected embodiments of electric switches taken in conjunction with the accompanying drawings, wherein.

Figure 1:
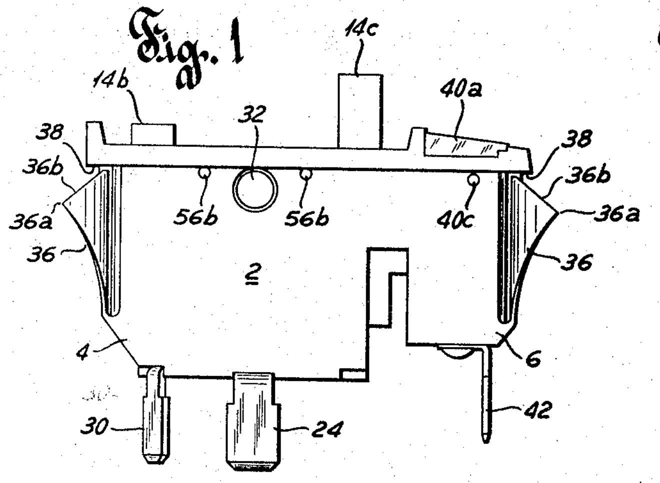
FIGURE 1 is a front elevational view of an electric switch with one indicator light and including a first type of switch actuator.
Figure 2:
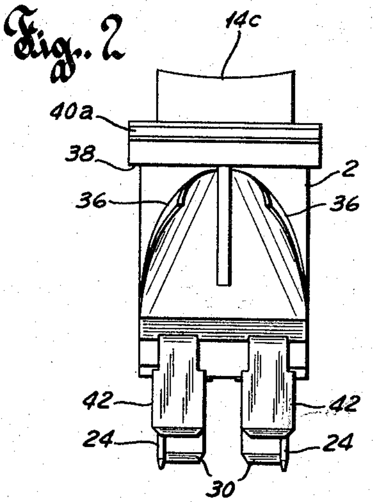
FIG. 2 is a right end view of the switch of FIG. 1.
Figure 3:
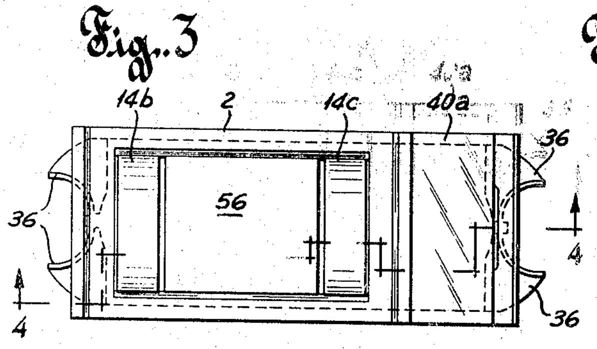
FIG. 3 is a top view of the switch of FIG. 1.
Figure 13:
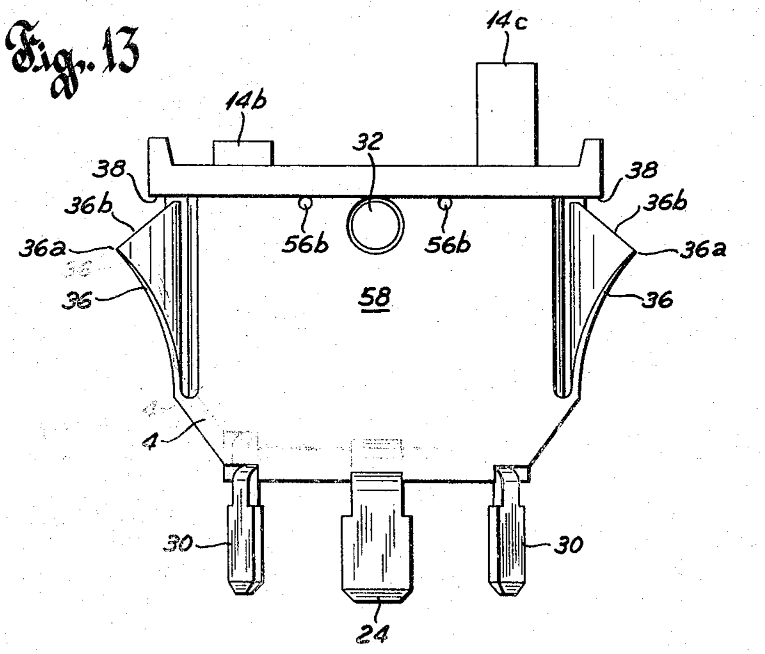
FIG. 13 is a front elevational view of an electric switch without an indicator light.
Figure 14:
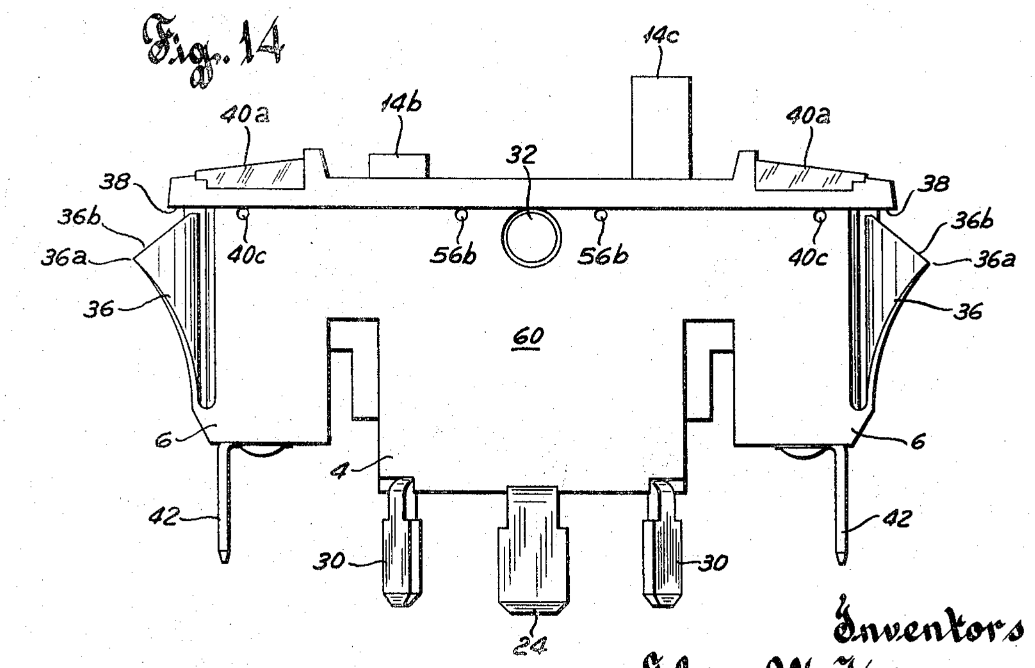
FIG. 14 is a front elevational view of an electric switch with two indicator lights.

Referring to FIG. 1, there is shown a first embodiment of the invention including a switch and one indicator light at the right-hand end. Two modified embodiments are shown in FIGS. 13 and 14 consisting of a switch with no indicator light and a switch with two indicator lights, one at each end. Other modifications include unique and interchangeable switch actuators adapted for use in any of of the three switch embodiments and different lamp structures adapted for use in the embodiments of FIGS. 1 and 14 as hereinafter described.

The switch with one indicator light embodiment of the invention comprises a molded base 2 as shown in FIGS. 1–14 which is open at the top and has a plurality of small holes at the bottom through which internal contacts are electrically and mechanically connected to external electric connectors or terminals.

Figure 4:
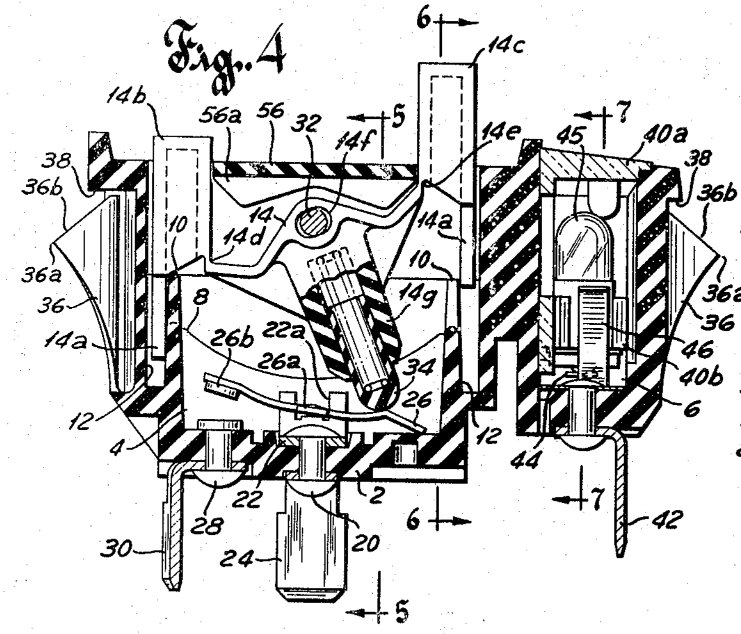
FIG. 4 is an enlarged cross-sectional view taken along line 4—4 of FIG. 3.
Figure 5:
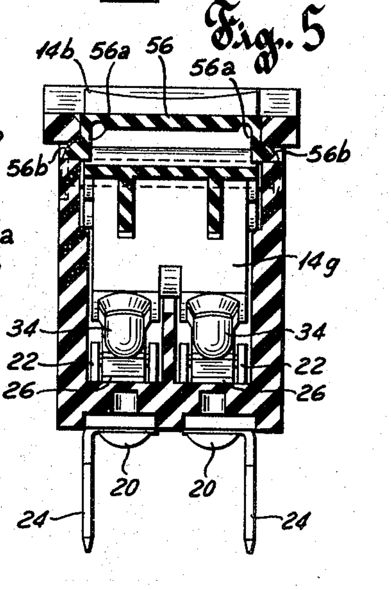
FIG. 5 is a cross-sectional view of the switch taken along line 5—5 of FIG. 4.

The molded base includes two compartments, a switch compartment 4 at the left and central portions of the base and a smaller lamp compartment 6 at the right-hand end as shown in FIGS. 1 and 4. Switch compartment 4 is adapted for a double-pole, single-throw switch as shown in FIGS. 4 and 5 whereby the switch compartment is divided at its lower portion by a low wall 8. This dividing wall is provided with an arcuate upper edge, higher at the ends than at the middle, and curved on the radius from the pivot point of the actuator to provide clearance for swinging of the switch actuator.

Figure 6:
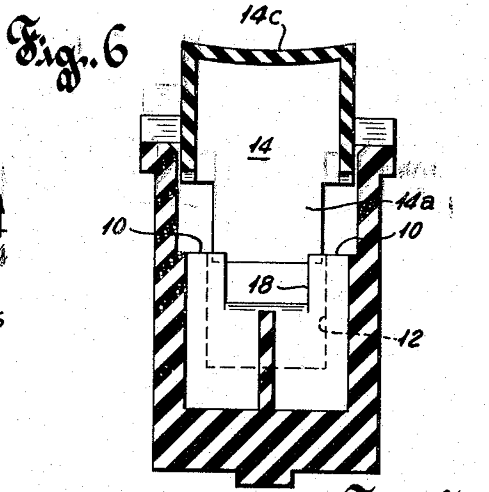
FIG. 6 is a cross-sectional view of the switch taken along line 6—6 of FIG. 4.

The end walls of the switch compartment are provided with guiding slots for the two-pushbutton actuator. For this purpose, each end wall is stepped to provide a shoulder 10 slightly above its midportion as shown in FIGS. 4 and 6. A vertical, flat slot 12 extends down from each such shoulder to about the halfway point of the dividing wall for slidably receiving a depending guide portion 14*a* of pushbutton unit 14. The inner wall of slot 12 facing the switch compartment is slightly tapered or inclined to make the slot slightly wider at the top to facilitate insertion of guide portion 14*a* therein. This inner wall of slot 12 is provided with a notch 18 shown in FIG. 6 which is narrower than slot 12 and extends down to the top of dividing wall 8. As will be apparent, this notch reduces the frictional engagement between guide portion 14*a* of the pushbutton unit and the guiding slot to facilitate operation of the switch.

The base at the bottom of the switch compartment is provided with as many as three holes for each pole of the double-throw switch. The three holes of each set of holes are in alinement on each side of the dividing wall as shown in FIG. 4. The middle hole receives a conventional rivet 20 for connecting a stationary contact 22 within the switch compartment to an external connector terminal 24. Contact 22 is provided with means supporting a movable contact 26 for rocking movement. This means comprises the provision of a generally U-shape for contact 22 having like notches 22*a* in opposite upstanding portions thereof for receiving lateral ears 26*a* of movable contact 26 and allowing rocking movement of the movable contact therein under the force of an actuator hereinafter described. One or both end holes of each pole of the switch receives a rivet 28 for connecting a stationary contact element to an external terminal 30. The stationary contact element consists of a flat head formed integrally with rivet 28 within the switch compartment which is arranged for engagement by a similar contact element 26*b* secured to the lower surface of one or both end portions of the movable contact.

Pushbutton unit 14 is molded in one piece from a plastic material and is provided with a pair of upstanding pushbuttons 14*b* and 14*c* which are hollow and are connected to the central pivoted section by respective integral hinges 14*d* and 14*e*. The central pivoted section provided with a hole 14*f* through its upper portion for receiving a pivot pin 32 mounted through a pair of holes in the front and rear walls of the base. The central pivoted section of the pushbutton unit is provided with a depending portion 14*g* having holes open at the lower end, each adapted for receiving a helical spring biased plunger 34 which resiliently engages the movable contact and rides thereon when a pushbutton is pressed.

The pushbutton unit is molded in one piece of a special material which will allow bending of hinge portions 14*d* a large number of times without breaking. These hinge portions are only a few thousandths of an inch thick, preferably about ten-thousandths of an inch thick with a tolerance of plus one and minus two-thousandths of an inch so that they may range from eight to eleven-thousandths of an inch but they will withstand several hundred thousand or even millions of operations without breaking. A material having these characteristics is a filled polypropylene of the self-extinguishing or equivalent type, filled meaning that certain material such as asbestos fibers or the like which give it the desired properties has been added to the polypropylene which is substantially clear color and self-extinguishing meaning that a chemical additive such as an oxide or the like prevents it from burning or deteriorating under electrical heat. An example of this type of polypropylene material is Hercules Powder Company "Pro-Fax 761". While this filled material is preferable, althernatively plain polypropylene with heat resistant coating could be used.

As shown in FIGS. 1–4, the left and right ends of the base 2 are provided with means affording snap-in mounting in a rectangular aperture in a mounting plate or panel. The snap-in device on each end of the base consists of a pair of curved wings 36 molded integrally with the base. These wings are generally rectangular spring-like flaps integral with the base along the vertical center line and lower portion of the base. The upper, outer substantially triangular halves of these flaps curve away from the end wall of the base and the upper and side edges of these curved portions are tapered slightly toward one another to afford snap-in mounting and gripping self-adjustment steplessly or to continuously varying thicknesses of mounting panel. As will be apparent, when the switch is pressed into an aperture in a mounting panel, the end edges of the aperture cam on the side edges of and stress wings 36 toward the end walls of the switch base and the edges of the panel then snap over the high points 36*a* on these wings so that the panel is gripped between shoulder 38 and upper inclined edges 36*b* of wings 36.

As shown in FIG. 4, lamp compartment 6 is open at the top and has small holes at the bottom through which electrical connections are made to the lamp.

Figure 7:
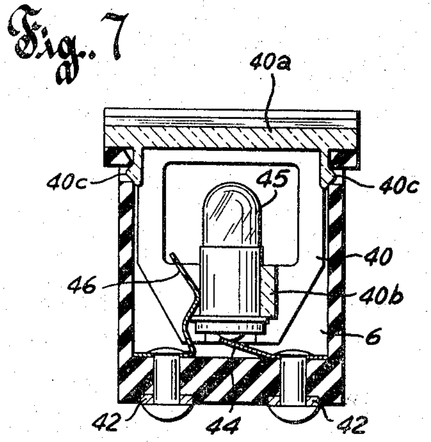
FIG. 7 is a cross-sectional view of the indicator lamp taken along line 7—7 of FIG. 4.
Figure 8:
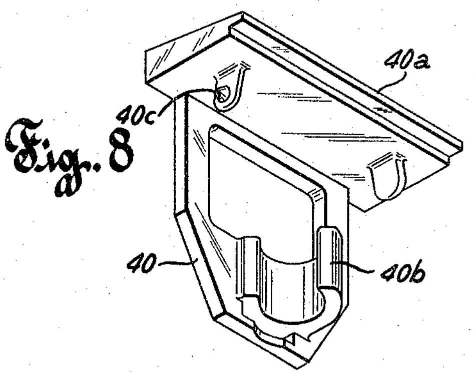
FIG. 8 is an isometric view of the unitary lamp bulb holder and lens.

One form of lamp mounting is shown in FIGS. 7 and 8. This form comprises a lamp holder 40 integral with the lens 40*a* or transparent plate which covers the lamp compartment. A pair of rivets extend through holes in the bottom to connect external terminals 42 to electrical connectors in the lamp compartment. Lamp holder 40 depends from lens 40*a* and has molded thereon a hook 40*b* into which a lamp bulb 45 may be pressed. The lamp holder with the lamp bulb held thereon is then pressed as a unit into lamp compartment so that depending nibs 40*c* snap into holes at the upper portions of the front and back walls of the lamp compartment. One connector 44 is formed to engage the center terminal of the lamp bulb and the other connector 46 is formed to engage the periphery of the lamp bulb base when the unit is pressed into the compartment, these connectors being connected to the two rivets, respectively.

Figure 9:
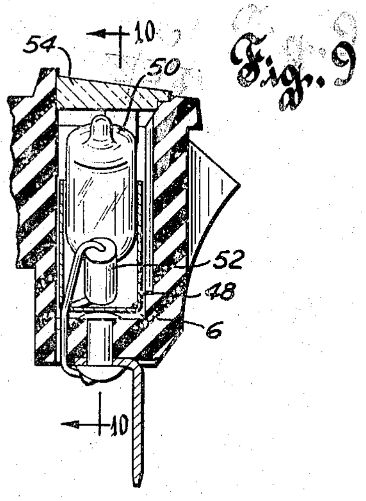
FIG. 9 is a sectional view like the right-hand portion of FIG. 4 of a modified indicator lamp usable in the switches of FIGS. 1, 13 and 14.
Figure 10:
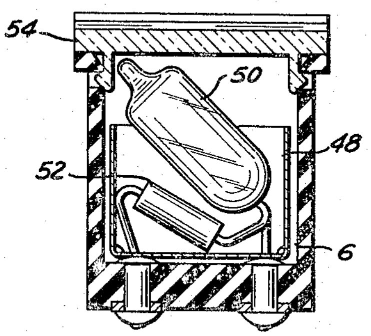
FIG. 10 is a cross-sectional view taken along line 10—10 of FIG. 9.

Another form of lamp mounting is shown in FIGS. 9 and 10. For this purpose, two additional small holes in the bottom of the lamp compartment are used. A reflector 48 is inserted in the lamp compartment. Lamp bulb 50 has two connector leads one of which extends through one of the small holes and is soldered to the rivet or terminal on the outside of the base. The other lamp lead is connected to one lead of a resistor 52 and the other lead of the resistor extends through the other small hole and is soldered to the other external terminal. Lens 54 is like that in FIGS. 7 and 8 except that it does not include the depending lamp holder and similarly snaps into place to cover the lamp compartment.

Figure 11:
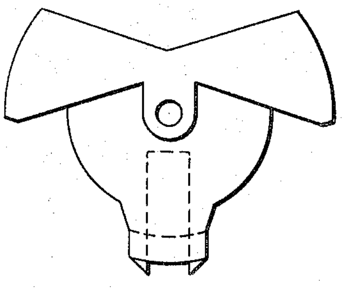
FIG. 11 is a front elevational view of a second type of switch actuator usable in the switches of FIGS. 1, 13 and 14.

FIG. 11 shows a rocker type actuator which may be substituted for the pushbutton unit 14 in FIGS. 1–6. When the rocker is used, cover 56 shown in FIG. 4 is not needed. As will be apparent, cover 56 covers the space between pushbuttons 14*b* and 14*c*. This cover is provided with depending skirts 56*a* on its front and rear edges as shown in FIGS. 4 and 5. Each such skirt is provided with a pair of nibs 56*b* molded integrally therewith which snap into a pair of small holes in the walls of the base. When the rocker of FIG. 11 is used, this cover is left out and the rocker button closes the top of the base and actuates the movable contact.

Figure 12:
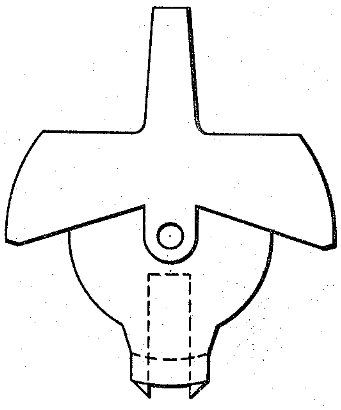
FIG. 12 is a front elevational view of a third type of switch actuator usable in the switches of FIGS. 1, 13 and 14.

FIG. 12 shows a paddle type actuator which may be substituted for the pushbutton unit 14 of FIGS. 1–6. This paddle actuator is like the rocker of FIG. 11 except that it has an upright paddle-like member molded integrally therewith which is grasped by the user to operate the switch. On the other hand, the rocker of FIG. 11 requires depression on either the left or or right side portion by the finger of the user. Otherwise, the paddle and rocker are alike as will be apparent from the drawing.

FIG. 13 shows a switch having a base 58 like that in FIGS. 1–6 except that it has no light. As shown in the drawing, the base has only a switch compartment and the snap-in wings 36 are molded on the ends of this modified switch base. Otherwise, the switch is like that described in connection with FIGS. 1–4.

FIG. 14 shows a switching having a base 60 like that in FIGS. 1–6 except that it has two lights, one on each of the left and right end of the base. Each of these lights is like that described in connection with FIGS. 1–6 and may use either of the lamp modifications shown in FIGS. 7–10. The snap-in wings 36 are molded on the lamp compartment as shown in the drawing. Otherwise, this variation conforms to that hereinbefore described.

While the apparatus hereinbefore described is effectively adapted to fulfill the objects stated, it is to be understood that we do not intend to confine our invention to the particular preferred embodiments of electric switches disclosed, inasmuch as they are susceptible of various modifications without departing from the scope of the appended claims.

We claim:

1. An electric switch comprising:

a molded insulating base having a switch compartment open at the top;

stationary contacts in said compartment connected through said base to external terminals;

a movable contact mounted for rocking movement to bridge a pair of said stationary contacts;

an actuator pivoted to said base and having a spring-biased plunger for actuating said movable contact;

and means affording snap-in mounting of said base in an aperture in a mounting panel comprising;

pairs of resilient wings molded integrally with the base, each pair of wings comprising two generally rectangular flaps having adjacent, inner and lower edges integral with the base and having their upper-outer corners curved away from the base, and the outer and upper edges inclined toward each other whereby such inclined outer edges act as a resilient cam when the switch is pressed into an aperture in a mounting panel and the upper inclined edges afford balanced gripping of a range of different thicknesses of panel between it and an overhanging lip on the base.

2. The invention defined in claim 1, wherein said actuator comprises:
- a one piece molded pushbutton unit pivoted at a mid-portion to the base and having two pushbuttons at laterally spaced points thereof and a lower portion for actuating the movable contact, each said pushbutton integrally molded with and connected to the remainder of said unit by a thin section of resilient material forming a hinge portion.

3. The invention defined in claim 2, wherein said one piece molded pushbutton unit is made of a plastic material which allows bending of said hinge portions of a multiplicity of times without breaking such as polypropylene.

4. The invention defined in claim 2, wherein said pushbutton unit comprises:
- elongated strips integral with and hanging from said pushbuttons for guiding said pushbuttons when they are depressed;
- and said base comprises elongated slots in the sides of said switch compartment for receiving and guiding said trips.

5. The invention defined in claim 2, together with:
- a snap-in cover covering the opening in the base between the pushbutons and having a pair of nibs on each of opposite sides molded integrally therewith fitting into corresponding recesses in the walls of the base for retaining the cover in position.

6. The invention defined in claim 1, wherein said actuator comprises:
- a rocker button having a pair of upwardly inclined surfaces either one of which may be pressed by the finger of the user to actuate the switch.

7. The invention defined in claim 1, wherein said actuator comprises:
- a paddle-type operating lever pivoted to said base and having an upstanding flat portion which may be grasped by the user to rock the actuator for operating the switch.

8. The invention defined in claim 1, wherein said base comprises:
- a lamp compartment molded integrally therewith which is open at the top;
- a lens covering the opening at the top and having resilient depending portions provided with nibs molded integrally with the lens which snap into corresponding recesses in the base to hold the lens in place;
- and connectors extending through the bottom of the lamp compartment to external terminals.

9. The invention defined in claim 8, wherein said lens comprises:
- a lamp holder molded integrally with said lens and hanging therefrom and including means for mounting a lamp bulb;
- and contacts mounted to said connectors and arranged to engage the center and side terminals of the lamp bulb when said lens is snapped in place.

10. An electric switch comprising:
- an insulated housing having a switch compartment open at the top;
- stationary contacts in said compartment connected through said housing to external terminals;

- a movable contact mounted for rocking movement to engage said stationary contacts;
- an actuator having a portion pivoted in said housing and having an extended portion for operating said movable contact;
- said acuator comprising at least one substantially linearly movable button molded integrally with said pivoted and extended portions and connected to said pivoted portion by a thin section of material forming a hinge which can be bent repeatedly without breaking whereby the substantially linear movement of said button is translated into rocking movement of said pivoted and extended portions of said actuator.

11. The invention defined in claim 10, wherein:
- said button is connected to said pivoted portion at a point spaced to one side of the pivot for rocking said extended portion in one direction;
- and a second substantially linearly movable button similarly connected by a thin section of the same material to said pivoted portion at a point equally spaced to the other side of the pivot for rocking said extended portion in the other direction.

12. An electric switch comprising:
- an insulated housing having molded therein a switch compartment open at the top and a lamp compartment open at the top;
- stationary contacts in said switch compartment connected through the housing to external terminals;
- a movable contact mounted for movement to engage said stationary contacts;
- an actuator mounted to the housing walls at the top opening for operating said movable contact;
- electrical connectors mounted in said lamp compartment and connected through the housing to external terminals;
- and a one-piece molded combined lamp holder and lens including means for snap-in mounting thereof in said lamp compartment, said lamp holder including a depending portion insertable into said lamp compartment and having a clip molded thereon for holding a lamp bulb so that it engages said connectors when snapped in place and said lens including a light transmitting cover for closing the open top of said lamp compartment.

References Cited by the Examiner

UNITED STATES PATENTS

| | | | |
|---|---|---|---|
| 2,487,970 | 11/1949 | Horn et al. | 200—5 |
| 2,523,786 | 9/1950 | Soreng | 200—168 |
| 2,523,786 | 9/1950 | Soreng | 200—168 |
| 3,271,550 | 9/1966 | Wiley | 200—172 |

FOREIGN PATENTS

| | | |
|---|---|---|
| 1,297,295 | 3/1962 | France. |

References Cited by the Applicant

UNITED STATES PATENTS

| | | |
|---|---|---|
| 2,858,631 | 11/1958 | P. Jorick. |
| 3,079,581 | 2/1963 | F. Klumpp. |
| 3,115,308 | 12/1963 | W. E. Stark. |
| 3,134,004 | 5/1964 | J. Long. |
| 3,142,742 | 7/1964 | J. J. Kaleba et al. |

ROBERT K. SCHAEFER, *Primary Examiner.*

H. O. JONES, *Assistant Examiner.*